US008560954B1

(12) United States Patent
Nakajima et al.

(10) Patent No.: US 8,560,954 B1
(45) Date of Patent: Oct. 15, 2013

(54) DISPLAYING SOCIAL ANNOTATION DATA

(75) Inventors: Kaisuke Nakajima, San Jose, CA (US); Jennifer W. Lin, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/446,794

(22) Filed: Apr. 13, 2012

(51) Int. Cl.
*G06F 3/00* (2006.01)
(52) U.S. Cl.
USPC .......................................... 715/753
(58) Field of Classification Search
USPC .......................................... 715/753
See application file for complete search history.

(56) References Cited

U.S. PATENT DOCUMENTS

| 5,828,837 | A | 10/1998 | Eikeland |
| 2007/0043688 | A1* | 2/2007 | Kountz et al. ........................ 707/1 |
| 2009/0191898 | A1* | 7/2009 | Lewis et al. ................. 455/456.3 |
| 2009/0198675 | A1* | 8/2009 | Mihalik et al. ....................... 707/5 |
| 2009/0287674 | A1 | 11/2009 | Bouillet et al. |
| 2010/0064007 | A1* | 3/2010 | Randall .......................... 709/204 |
| 2011/0196863 | A1* | 8/2011 | Marcucci et al. ............... 707/728 |
| 2012/0131032 | A1* | 5/2012 | Rakshit .......................... 707/767 |
| 2012/0166453 | A1* | 6/2012 | Broder .......................... 707/752 |

OTHER PUBLICATIONS

"Using Friend Stream", HTC [online]. First Accessed on: Sep. 9, 2011. Retrieved from the Internet: <http://www.htc.com/help/uk/howto_iframe.aspx?id=195&type=1&p_id=313> (2 pgs.).
Kakkar, "Nokia to offer location based recommendations", ZDNet [online], May 18, 2011. Retrieved from the Internet: <http://www.zdnet.com/blog/india/nokia-to-offer-location-based-recommendations/514> (4 pgs.).

* cited by examiner

*Primary Examiner* — William Bashore
*Assistant Examiner* — Hien Duong
(74) *Attorney, Agent, or Firm* — Shumaker & Sieffert, P.A.

(57) ABSTRACT

Aspects of the present disclosure provide techniques that may enable social annotation data to be displayed based on an ordered arrangement. In one example, a method includes receiving an indication of a selection of a social annotation field displayed at a graphical user interface (GUI), and updating the GUI to include social information associated with a portion of the plurality of other users and a plurality of graphical indications selectable by the user to change an order of the social information, wherein the social information is based on the social annotation data and is output in an ordered arrangement associated with a graphical indication displayed at the GUI. The method may also include receiving an indication of a selection of another graphical indication, and updating, based on the selection, the GUI to include the social information associated with another portion of the plurality of other users in another ordered arrangement.

23 Claims, 7 Drawing Sheets

DISPLAYING SOCIAL ANNOTATION DATA

BACKGROUND

Computers and mobile devices, such as mobile phones, have become increasingly interconnected due to the widespread availability of wired and wireless connections to communications networks such as the Internet. This interconnectivity has enabled ways for people to communicate with people far and near and to maintain social and professional bonds.

A popular means of communication that takes advantage of the interconnectivity are web-based social network service applications. In such social network applications, a user can post a variety of comments, from short messages or comments about his status or activities or just about anything, to photos and videos and articles of interest. Additionally, users of social network service applications may provide social annotation data regarding an item while directly accessing websites, products, or advertisements.

SUMMARY

In one example, a method receiving, by a computing device associated with a user, an indication of a selection of an item displayed at a graphical user interface of the computing device. The method includes updating, by the computing device, the graphical user interface to display, in a first ordered arrangement, at least a portion of social information associated with the item and provided by a plurality of other users, and a plurality of selectable objects each corresponding to one of a plurality of ordered arrangements. The method may include receiving, by the computing device, an indication of a selection of a selectable object of the plurality of selectable objects, and, responsive to receiving the indication of the selection of the selectable object, updating, by the computing device and based at least in part on the selection of the selectable object, the graphical user interface to display a second portion of the social information associated with the item in a second ordered arrangement.

In another example, a computer-readable storage medium is encoded with instructions that, when executed, cause one or more processors of one or more computing devices to perform operations. The operations include receiving an indication of a selection of an item displayed at a graphical user interface of the computing device. The operations may include updating the graphical user interface to display, in a first ordered arrangement, at least a portion of social information associated with the item and provided by a plurality of other users, and a plurality of selectable objects each corresponding to one of a plurality of ordered arrangements. The operations may include receiving an indication of a selection of a selectable object of the plurality of selectable objects, and, responsive to receiving the indication of the selection of the selectable object, updating, based at least in part on the selection of the selectable object, the graphical user interface to display a second portion of the social information associated with the item in a second ordered arrangement.

In another example, a server system comprises one or more server computers and an application operable to provide instructions to the one or more server computers to receive an indication of a selection of an item displayed at a graphical user interface of the computing device. The instructions may include instructions to update the graphical user interface to display, in a first ordered arrangement, at least a portion of social information associated with the item and provided by a plurality of other users, and a plurality of selectable objects each corresponding to one of a plurality of ordered arrangements. The instructions may include instructions to receive an indication of a selection of a selectable object of the plurality of selectable objects, and, responsive to receiving the indication of the selection of the selectable object, update, based at least in part on the selection of the selectable object, the graphical user interface to display a second portion of the social information associated with the item in a second ordered arrangement.

In another example, a method includes storing, by one or more computing devices, social annotation data provided by a plurality of users for an item. The method may also include determining, by the one or more computing devices, a plurality of ordered arrangements of the social annotation data for each respective user of the plurality of users, wherein at least one of the plurality of ordered arrangements is based on a relationship strength value for each respective user of the plurality of users, wherein the relationship strength value is based at least in part on an amount of contact between the respective user and each other user of the plurality of users, and wherein at least one of the plurality of ordered arrangements is based on distance between at least one of a physical location of a respective computing device associated with the respective user and a physical location of each respective client device associated with each other user of the plurality of users, and a physical location associated with the item and the physical location of each respective client device associated with each other user of the plurality of users. The method may further include receiving, by the one or more computing devices from a client device, a request for an ordered arrangement of the social annotation data, and providing, by the one or more computing devices to the client device, the ordered arrangement of the social annotation data.

The details of one or more embodiments are set forth in the accompanying drawings and the description below. Other features, objects, and advantages will be apparent from the description and drawings, and from the claims.

DETAILED DESCRIPTION

Figure 1:
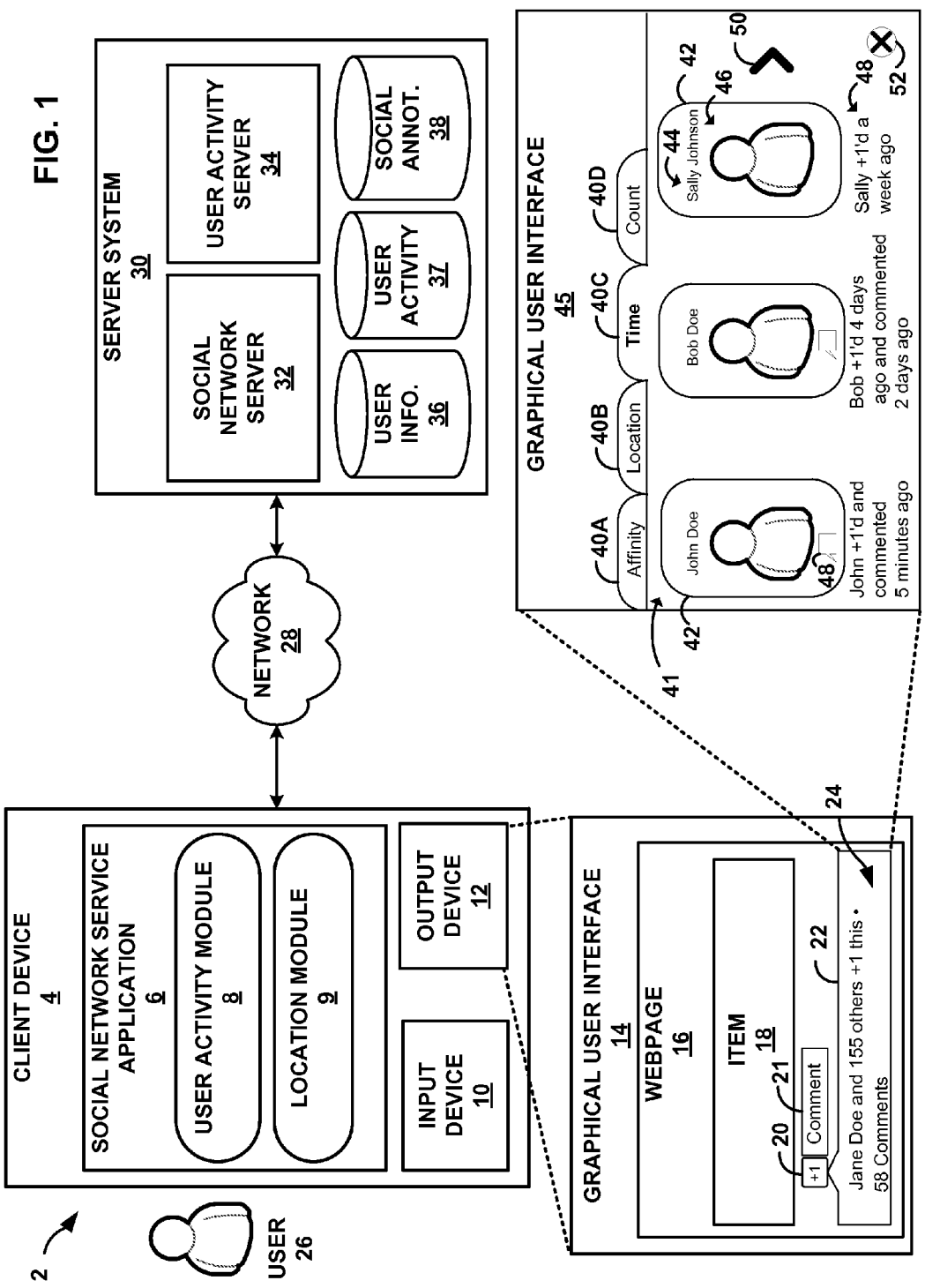
FIG. 1 is a conceptual diagram illustrating an example network system that may be operable to display social annotation data of users, in accordance with one or more aspects of this disclosure.

Computers and mobile devices, such as mobile phones, have become increasingly interconnected due to the widespread availability of wired and wireless connections to communications networks such as the Internet. However, touchscreens of some devices, for example, mobile phones, may be relatively small in size. As a result, the information displayed at the touchscreen may be limited.

Users may view and interact with web pages that contain text, images, videos and other multimedia content. In one example, webpages may enable users to provide social annotation data (e.g., comments and other user responses such as "+1," "like," etc.) when accessing the webpage. The social annotation data can be associated with a social network service. Social annotation data from users of the social network services may indicate that the users recommend various items (e.g., particular websites, products, advertisements, etc.). When accessing webpages and/or logging into an account associated with the social network service, a user may be shown social annotation data from her social contacts that have agreed to share their annotations. Any participation is optional, users set privacy levels consenting users Viewing social annotation data provided by others may be helpful in evaluating various items.

However, because some computing devices, such as mobile phones, may have relatively small touchscreens, the social annotation data that is displayed may be limited. That is, only a portion of the social annotation data may be displayed to the user. Thus, deciding which user's social annotation data to display may be difficult. In some examples, social annotation data may be displayed in chronological order. For example, a user visiting a webpage may see "Jane Doe and 155 others +1 this • 58 comments," where Jane Doe may have been the first person (e.g., earliest in time) to +1 the webpage. To see the other 154 users who recommended the webpage and/or to view the comments made by other users, the user may select the social annotation field and the other +1's and/or comments may be displayed to the user in chronological order. However, social annotation data (e.g., "Jane Doe +1'd this" or "Jane Doe bought this") may be more meaningful when the social annotation data displayed is from people a user knows (e.g., friends of the user) or from people that are most familiar with a particular item. In other words, viewing social annotation data corresponding to items, such as webpages, products, locations, and/or advertisements, etc., from people that have a connection and/or familiarity with the particular item may be more beneficial to the user. Additionally, a user may trust opinions of social contacts such as friends, colleagues and/or close contacts, more than opinions of strangers. Thus, the user may wish to view social annotation data provided by social contacts.

Techniques of the present disclosure may, in various instances, display social annotation data in a more relevant and organized manner. For example, a user may see a portion of the social annotation data within a social annotation field when viewing a webpage or using a search engine. In one example, a user visiting a webpage may see a social annotation field. The user may select the social annotation field by tapping or clicking anywhere within the social annotation field. Selecting the social annotation field may toggle a gallery view of social annotation data. The gallery view is typically a display area that includes organized entries for structured data, for example a display area in which each data item is shown in a regular or semi-regular pattern, such as in rows, columns, or on a grid. The gallery view can be a plurality of tabs, links, text, images, check boxes, buttons, drop down menus, lists, and window panes.

As discussed herein, users interacting with communications networks, such as the Internet, may encounter a large amount of social annotation data provided by other users. To enable users to obtain more relevant and meaningful information, aspects of this disclosure provide for displaying social information of other users that provided social annotation data in a gallery view. In one example, the gallery view can include a group of graphical indications (e.g., tabs) that organize social information associated with social contacts that have provided social annotation data related to an item (e.g., the webpage or a topic on the webpage) by various criteria, such as "Affinity," "Count," "Location," and "Time." Therefore, users may be presented with a plurality of tabs such that the user may determine how to organize the other users that have provided social annotation data. The gallery view may also include a portion of other users that have provided social annotation data. For example, the portion may include, for example, twenty users of the total number of users that provided social annotation data.

In various instances, identifying information for each user is displayed in the gallery view. In one example, the social information may include a name and picture of a user that provided social annotation data. For example, the name and picture may be associated with an account of the user with the social network service. In some examples, the portion of other users may be displayed in an ordered arrangement based on an order associated with the currently selected graphical indication. Additionally, an icon, such as a comment bubble, may be displayed beneath the profile picture to indicate that a particular user has provided a comment. The user may select the comment bubble to display the comment provided by the user.

In some examples, one or more servers may be configured to monitor user interaction with the gallery view interface. For example, the one or more servers may monitor which displayed users are selected while the user is interacting with the gallery view interface. Monitoring the user interaction within the gallery view may provide information indicating that a user values one user's opinion more than another user's opinion. The monitored user interactions may be taken into account when selecting which users to display in the gallery view. For example, when determining the ordered arrangement of users, previous monitored user interactions may change the ordered arrangement within each graphical indication.

Aspects of this disclosure may optimize social annotation data displayed to users by displaying social annotation data in a gallery view that is customized based on each user. In some examples, the social annotation data may be displayed based on an amount of contact between users and a location between users. Additionally, the social information displayed may be customized according to how each user previously interacted with other social annotation data. As such, the social annotation data that is displayed to the user will be more meaningful and more useful especially when the social annotation data is displayed within the constraints of a limited display area, such as a mobile phone touchscreen.

FIG. 1 is a conceptual diagram illustrating an example network system 2 that may be operable to display social annotation data 24 of users, in accordance with one or more aspects of this disclosure. System 2 includes client device 4, network 28, and server system 30. Client device 4 includes input device 10, output device 12, and social network service application 6, which further includes user activity module 8 and location module 9. Output device 12 may display graphical user interface (GUI) 14. GUI 14 may include a webpage 16 and item 18. The item 18 can be any content that may be displayed via a webpage. Examples of items include, but are not limited to, the webpage itself, websites, products, topics, articles, and advertisements, etc.

GUI 14 may further include social annotation data 24 displayed within a social annotation field 22. Additionally, social annotation buttons 20, 21 may be displayed that enable a user to provide social annotation data. User 26 may view webpage 16 including item 18. As illustrated in FIG. 1, a plurality of users have provided social annotation data, such as social annotation data 24. The social annotation data 24 states "Jane Doe and 155 others +1 this • 58 comments". As used herein, "social annotation data" is defined as social annotations provided by users via social network service providers. In some examples, social annotations may include, but is not limited to, "+1'ing", commenting, and sharing. In some example, a type of social annotation data 24 may be associated with a social network service. For example, each social annotation service provider may have various types of social annotations (e.g., Google+ includes "+1'ing", Facebook includes "Liking", etc.). Social annotation field 22 is a portion of GUI 14 in which the social annotation data is displayed. As illustrated in FIG. 1, only a limited portion of all users that have provided social annotation data 24 is displayed. For example, Jane Doe's name is displayed, but none of the other users' names are displayed. User 26 may not know Jane Doe and thus the opinion of Jane Doe (e.g., Jane Doe's +1 of item 18) may be irrelevant to user 26.

Furthermore, GUI 14 may include social annotation buttons 20, 21 that enable a user to provide social annotation data 24. For example, user 26 may select social annotation button 20 to "+1" and/or social annotation button 21 to comment on item 18. Social annotation button 20 may include a graphical representation illustrating the social action. As illustrated in FIG. 1, social annotation button 20 includes a "+1" indicating a social action (e.g., "+1'ing") associated with social annotation button 20.

Server system 30 may include one or more server computing devices. As shown in FIG. 1, server system 30 includes social network server 32 and user activity server 34. Additionally, server system 30 may include user information data store 36, user activity data store 37, and social annotation data store 38. Client device 4 and server system 30 may be operatively and/or communicatively coupled by network 28. Network 28 may include wired or wireless networks or both. For example, network 28 may include a wide-area network such as the Internet, a local-area network (LAN), a wireless local-area network (WLAN), an enterprise network, or one or more other types of networks. In some examples, network 28 may include one or more different networks. For instance, client device 4 and server system 30 may communicate using a WLAN, and other client devices associated with users that provided social annotation data may communicate with server system 30 using the Internet.

Examples of client device 4 may include, but are not limited to, portable or mobile devices such as mobile phones (including smart phones), laptop computers, personal digital assistants (PDAs), portable gaming devices, portable media players, and e-book readers, as well as semi-portable or non-portable devices, such as desktop computers. Client devices associated with users that provided social annotation data may be the same or different types of devices as client device 4. For example, client device 4 and a client device associated with a user that provided social annotation data may both be mobile phones. In another example, client device 4 may be a mobile phone and a client device associated with a user that provided social annotation data may be a desktop computer.

Client device 4 may include one or more input devices (e.g., input device 10 of client device 4). Input device 10 may include keyboards, pointing devices, microphones, presence-sensitive screens, and cameras capable of recording one or more images or video, as non-limiting examples. Client device 4 may also include one or more output devices (e.g., output device 12 of client device 4). Examples of output device 12 may include a video graphics card, computer display, sound card, presence-sensitive screen, and speakers.

Client device 4 may include social network service application 6. In some examples, social network service application 6 may include software computer applications that provide functionality described herein. Social network service application 6 may be, for example, associated with a social network service. In one example, user 26 may be a member of (e.g., has an account with) a social network service that provides social network service application 6. Social network service application 6 may also include user information modules, such as user activity module 8 and location module 9, as shown in social network service application 6.

Client device 4 may cause output device 12 to display GUI 14. For example, user 26 may access webpage 16 including item 18. As illustrated in FIG. 1, a plurality of users provided social annotation data 24. Social annotation data 24 may be displayed within a social annotation field 22. Social annotation data 24 may be provided by other users associated with the social network service. In other words, user 26 may be a member of one or more social network services and activity of other users of the social network services may be published to webpage 16 as social annotation data 24.

For example, social annotation data 24 indicates that Jane Doe and 155 other users have recommended item 18 and that 58 users have provided comments regarding item 18. As illustrated in FIG. 1, only one of the 155 users that provided social annotation data is identified (e.g., Jane Doe). In some examples, the portion of the social annotation data 24 displayed in social annotation field 22 may be organized according to chronological order. In other words, Jane Doe may have been the first user or the most recent user to provide social annotation data. However, user 26 may not know and/or value Jane Doe's opinion.

User 26 may provide an input selecting the social annotation field 22 to view the social annotation data 24. In response to user 26 selecting social annotation field 22, client device 4 may send a signal to server system 30 indicating that user 26 has selected social annotation field 22. Server system 30 may send data to client device 4 configured to display GUI 45. In one example, GUI 45 can be an overlay that is displayed across a portion of GUI 14 or may be a part of GUI 14. GUI 45 may include a gallery view of the social annotation data 24. For example, the gallery view may include a plurality of graphical indications. Graphical indications may include, but are not limited to, tabs, links, text, images, check boxes, button, drop down menus, and lists. As illustrated in FIG. 1, the graphical indications are tabs, such as tabs 40A-D (collectively "tabs 40"). Selecting each tab 40 can display a portion of the plurality of users that provided social annotation data 24 in an ordered arrangement, where the ordered arrangement is based on an order associated with each tab 40. As illustrated in FIG. 1, GUI 45 includes an affinity tab 40A, a location tab 40B, a time tab 40C, and a count tab 40D. While the example of GUI 45 shown in FIG. 1 includes four graphical indication (e.g., tabs), other examples of GUI 45 may include more than four graphical indications or less than four graphical indications and may include graphical indications associated with other ordered arrangements and other combinations of arrangements.

In one example, one tab of the plurality of tabs 40 may be selected as a default tab. That is, when user 26 provides input selecting social annotation field 22, a default tab will be selected and social information of the plurality of users that provided social annotation data 24 may be arranged in the ordered arrangement according to the default tab.

As illustrated in FIG. 1, time tab 40C is currently selected within GUI 45 and may display social information 41 for a portion of the plurality of users that provided social annotation data 24 based on an order associated with time tab 40C. For example, time tab 40C may display social information 41 of the portion of the plurality of users based on a time difference. That is, social information 41 of the portion of the plurality of users may be displayed in a chronological order (e.g., oldest to newest) or a reverse chronological order (e.g., newest to oldest) based on when user 26 selected the social annotation field 22.

As discussed herein, social information 41 of the users that provided social annotation data 24 may be displayed within GUI 45. In some examples, social information 41 may include at least one of a user identifier, a name, a handle, a username, a picture, a profile picture, the social annotation data, an amount of distance, a time difference, a graphical representation, a comment icon, and a graphical representation representing a respective social group of one or more social groups of the user account associated with the user. As illustrated in GUI 45, social information 41 includes a graphical representation 42 of a user that provided social annotation data 24 that is displayed within GUI 45. Graphical representation 42 may include any visually perceivable object that may be displayed via GUI 45. In some examples, graphical representation 42 may include a name 44 of a user and a picture 46 associated with the user. In one example, picture 26 may be a profile picture associated with an account (e.g., a profile) of the user at a social network service provider. Additionally, social information 41 may include icon 48, such as a comment bubble, that is displayed beneath graphical representation 42 to indicate that the particular user has provided a comment. User 26 may provide an input selecting icon 48 to display the comment provided by the displayed user. In some examples, user 26 may provide input selecting an exit button 52 to close GUI 45 and return to the underlying screen content (e.g., GUI 14).

As illustrated in FIG. 1, time tab 40C is selected and the portion of the plurality of users that provided social annotation data 24 are organized based on a time difference between when each user of the plurality of users that provided the social annotation data 24 and when user 26 selected social annotation field 22. As one example, when the users are organized in a reverse chronological order, the user that most recently provided social annotation data is displayed first. For example, "John Doe" recommended and commented on item 18 five minutes before user 26 provided input selecting social annotation field 22. Additionally, "Bob Doe" recommended item 18 four days before user 26 selected social annotation field 22 and commented on item 18 two days before user 26 selected social annotation field 22. Furthermore, "Sally Johnson" recommended item 18 one week before user 26 selected social annotation field 22. In an example where two users provided social annotation data simultaneously (e.g., at the same time), they may be organized based on another factor, such as alphabetically.

In some examples, GUI 45 may display users according to each tab 40 based on different types of social annotation data (e.g., recommendations, comments, etc.). For example, as illustrated in FIG. 1, social information of the plurality of users displayed within GUI 45 is arranged by the time they recommended item 18. If a user has also provided a comment, icon 48 may be displayed. In other examples, when user 26 provides input selecting social annotation field 22 and time tab 40C is selected, social information 41 of the plurality of users may be displayed based on a time at which each respective user commented on item 18 rather than when each respective user recommended item 18. In that example, an icon may be displayed to indicate whether a user that has provided a comment has also recommended item 18. In one example, in order to determine which type of social annotation data to organize the social information of the plurality of users, user 26 may select either the "+1" or the "comment" provided in the social annotation field 22. For example, the "+1" and "comment" displayed in the social annotation field 22 may be a link. Therefore, if user 26 selects "+1" in social annotation field 22, the social information for the portion of the plurality of users may be displayed according to +1 social annotation data. Similarly, if user 26 selects "comments" in social annotation field 22, the social information for the portion of the plurality of users may be displayed according to comment social annotation data.

In some examples, GUI 45 may further include one or more graphical arrow touch-targets 50. Upon receiving a selection of one of the graphical arrow touch-targets 50, computing device 4 may navigate to another page that displays at least one or more users different from the one or more users displayed on the first page of GUI 45. As discussed herein, GUI 45 may display social annotation data 41 for a portion of the plurality of users that provided social annotation data 24. In one example, the portion may be ten users. Thus, user 26 may provide input selecting graphical arrow touch-target 50 to scroll through the portion (e.g., ten) of users. The portion may be above ten or less than ten and may be user configurable. In one example, if user 26 scrolls to the last user displayed (e.g., the tenth user), user 26 may select the graphical arrow touch-target 50 and an additional portion (e.g., another ten users) may be displayed within GUI 45.

In at least one implementation, social network service application 6 may enable client device 4 to send user information associated with user 26 to server system 30. In some examples, user information may include, but is not limited to, a user account identifier, a location identifier corresponding to a physical location of client device 4, and a time identifier corresponding to a current time. In one example, social network service application 6 may send a user identifier to server system 30. For example, when user 26 selects social annotation field 22, social network service application 6 may send a signal including a user identifier to social network server 32 of server system 30. As discussed herein, the user identifier may enable social network server 32 of sever system 30 to identify a profile (e.g., an account) of a social network service associated with user 26. In response to receiving the user identifier, social network server 32 may generate an order of social information of the plurality of users that provided social annotation data 24 according to each tab 40 for display by client device 4.

As discussed herein, each tab of the plurality of tabs 40 provided in GUI 45 displays users that provided social annotation data 24 according to an order associated with the selected tab. The order in which the users are displayed within each tab 40 may be based on information unique to a user (e.g., user 26) that selected social annotation field 22. That is, the order that the social information of the portion of the plurality of users are displayed within GUI 45 for user 26 may be different than the order of social information that is displayed for another user. Therefore, user 26 may view the social annotation data 24 in a more meaningful manner.

In some examples, user activity module 8 is configured to generate user activity information in response to a user's (e.g., user 26) activity. For example, user activity module 8 may capture user 26's activity within social network service application 6. User activity may, for example, include any activity within the social network service application 6 or capture user interactions between users of a social network service provider. User activity information may be used to determine which users of the plurality of users that provided social annotation data 24 would be more meaningful to a user (e.g., user 26). In other words, the user activity information may be used to determine the ordered arrangement of users that provided social annotation data with each tab 40.

In at least some implementations, user activity information can comprise one or more of: (1) a user identifier (e.g., user name, identification code, profile information, etc.) that identifies a user that performed the user activity and an account associated with the user of the social network service, (2) an action identifier that identifies one or more actions (e.g., commenting, sharing, clicking on profiles, adding and/or removing users from social groups, etc.) performed within the social network service, (3) a time identifier that identifies a time at which the one or more actions were performed, (4) a contact identifier that identifies one or more actions (e.g., tagging, messaging, chatting, calling, scheduling meetings, etc.) performed between users, (5) a social annotation identifier that identifies social annotations provided by the user, and (6) other suitable information. In some examples, the user identifier may be stored in the user information data store 36 of server system 30, the action identifier, time identifier, and contact identifier may be stored in the user activity data store 37, and the social annotation identifier may be stored in the social annotation data store 38. As discussed herein, user information data store 36, user activity data store 37, and social annotation data store 38 may be individual data stores and/or a single data store.

User activity information generated by user activity module 8 may be sent by user activity module 8 from client device 4 to server system 30 where the user activity information or a portion thereof may be stored in various data stores. The user activity information may be used when determining an ordered arrangement of users. As one example, user 26 may send a message to "User A" via a message function of the social network service. User activity module 8 may sends at least an indication of the user activity (e.g., a message that indicates that user 26 sent User A a message) to server system 30. Server system 30 may store the contact identifier within user activity data store 37. Thereafter, social network server 32 and/or user activity server 34 may use the user activity information stored in user activity data store 37 to assist in determining the ordered arrangement of users associated with each tab 40.

In some examples, user client 6 may include location module 9 that generates location information corresponding to a physical location of client device 4. In one example, location module 9 may send location information associated with user 26 from client device 4 to server system 30 when user 26 selects social annotation field 22. Additionally, if user 26 provides social annotation data, location module 9 may send location information associated with user 26 from client device 4 to server system 30. In one example, client device 4 may include a global positioning system (GPS) device. In some examples, the GPS device may send and receive information from a global navigation satellite system. In some examples, the GPS device may determine one or more physical location coordinates that indicate a position of client device 4 using the global satellite system. Thus, in some examples, the location module 9 may obtain and send GPS coordinates from the GPS device and send the GPS coordinates to social network server 32 such that a physical location of client device 4 may be determined when user 26 selects the social annotation field 22 and/or provides social annotation data. As discussed herein, the physical location of user 26 may be used to determine the ordered arrangement of the plurality of users that provided social annotation data when location tab 40B is activated. Additionally, location information associated with user 26 and the plurality of users that provided social annotation data 24 may be stored in user information data store 36. For example, the location information associated with user 26 may not be a current physical location, but a current hometown location such as a city and state.

As illustrated in FIG. 1, the plurality of tabs 40 include an affinity tab 40A, a location tab 40B, a time tab 94C, and a count tab 94D. As discussed herein, the order associated with affinity tab 40A may be based on a relationship strength value. For example, the relationship strength value may be an indicator of how close two users are to each other and may be determined by monitoring user activity between users. The order associated with location tab 40B may be based on a an amount of distance. In some examples, the amount of distance may be based on a distance between a physical location of client device 4 associated with user 26 and a respective location of each one of a plurality of client devices, where each of the plurality of client devices is associated with a respective one of the plurality of users that provided social annotation data 24. In other examples, the amount of distance may be based on a distance between a location associated with item 18 and a respective location of each one of a plurality of client devices, where each of the plurality of client devices is associated with a respective one of the plurality of users that provided social annotation data 24. The respective location may be a physical location associated with the client device associated with a respective user of the plurality of users when the respective user provided social annotation data 24. Additionally, the respective location may be a location such as a city and state associated with the respective user (e.g., a current hometown) regardless of the physical location of the client device when the respective user provided social annotation data 24.

The order associated with time tab 40C may, as discussed herein, be based on a reverse chronological order of when users provided social annotation data 24. Additionally, the order associated with count tab 40D may be based on a number of users of a social group that provided social annotation data 24. For example, count tab 40D may display a graphical representation of user 26's social groups and display the number of users within each social group that provided social annotation data 24.

In some embodiments, social network server 32 and the user activity server 34 can be configured to obtain user activity information from client device 4 and the client devices associated with the plurality of users that provided social annotation data 24, and store the user activity information or a portion thereof to the user information data store 36, user activity data store 37, and social annotation data store 38. For example, social network server 32 and the user activity server 24 may obtain user activity information over a period of time and continually update and store user information, user activity information, and social annotation information to the user information data store 36, user activity data store 37, and social annotation data store 38, respectively. Certain user activity information may be published to a subset of users of a social network service as defined by user association information linking users in the social network.

In some examples, when user 26 selects social annotation field 22, client device 4 may send a signal indicating the selection to social network server 32. The signal may also include user identifier and location information. The user identifier may identify user 26 and an account associated with user 26 of the social network service. Social network server 32 and user activity server 34 may compare the social information of the plurality of users that provided social annotation data 24 with data stored in user information data store 36, user activity data store 37, and social annotation data store 38. For example, social network server 32 and user activity server 34 may use user activity information and the location information to determine the ordered arrangement of the plurality of users that provided social annotation data 24 for each tab 40 and send data configured to display social information for a portion of the plurality of users in the ordered arrangement within GUI 45 of client device 4.

Additionally, user activity server 34 may monitor user 26's activity within GUI 45. For example, user activity server 34 may generate user activity information regarding which user(s) displayed at GUI 45 user 26 selects while interacting with GUI 45. The user activity information may be stored at user activity data store 37. User 26's activity within GUI 45 may be used to adjust the order of the users displayed at GUI 45. For example, if user 26 consistently selects to view comments provided by "Bob Doe" more often than user 26 selects to view comments provided by "John Doe", user activity server 34 may adjust the order within each tab such that "Bob Doe" is displayed before "John Doe". In that instance, if user 26 selects time tab 40C "Bob Doe" would be displayed before "Jane Doe" regardless of when "Bob Doe" and "Jane Doe" recommended or commented on item 18.

In some examples, social network server 32 may utilize previously specified user information to control which users of the plurality of users that provided social annotation data 24 are displayed to user 26. That is, in some examples, user 26 may provide a default group of users that are displayed to user 26 via GUI 45 if they provided social annotation data 24 regardless of the ordered arrangement. In one example, user 26 may specify that a user (e.g., User Z) is to be displayed to user 26. In that instance, if User Z provided social annotation data one month before user 26 selects social annotation field 22, User Z would be displayed within GUI 45 in front of (e.g., to the left of) John Doe even though User Z provided social annotation before John Doe. Additionally, user 26 may override, modify, or otherwise change the ordered arrangement for each tab 40 according to user preferences (e.g., a number of users that are displayed, type of social annotation data, etc.).

Figure 2:
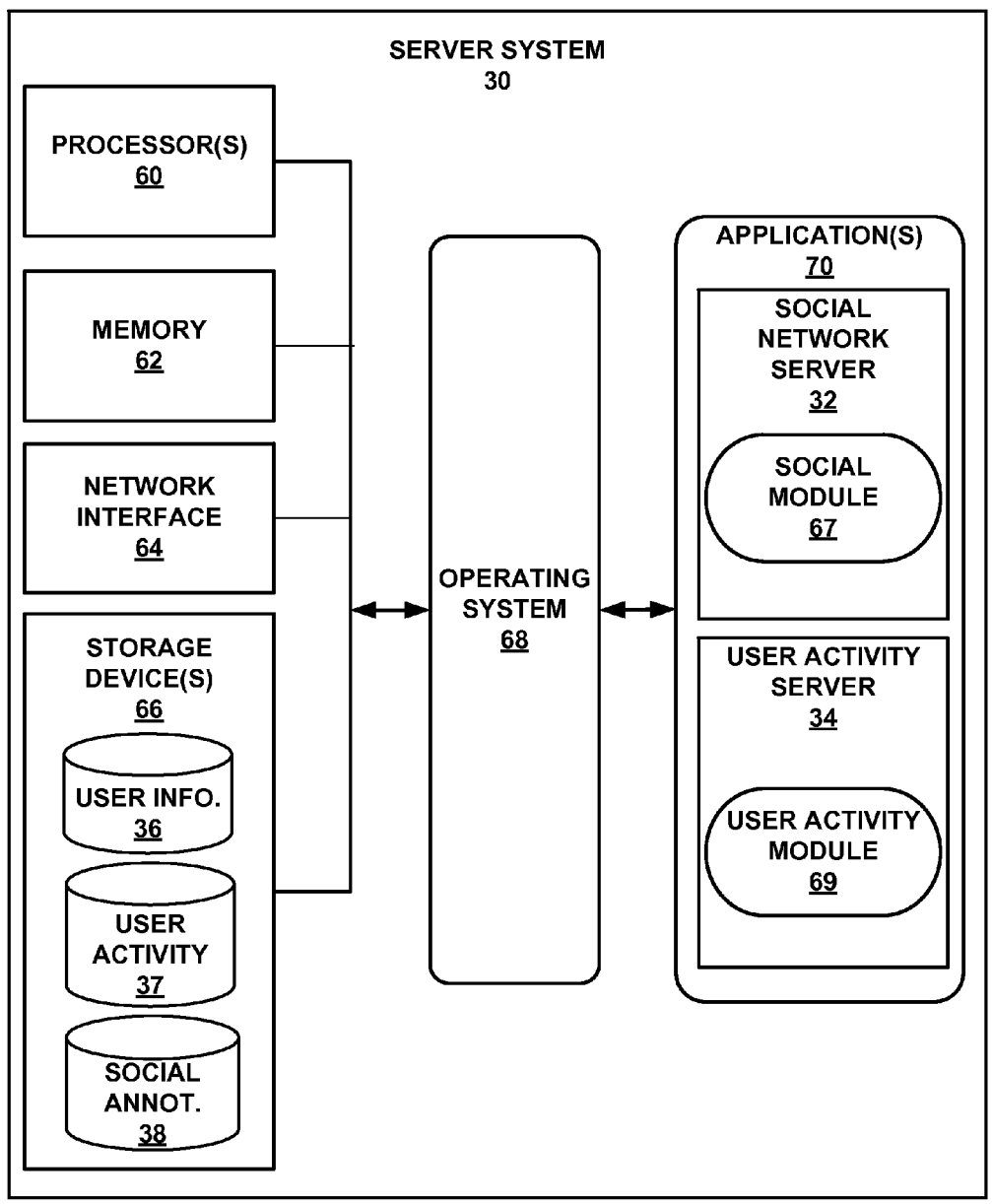
FIG. 2 is a block diagram illustrating an example computing device that may be operable to display a gallery view of social annotation data, in accordance with one or more aspects of this disclosure.

FIG. 2 is a block diagram illustrating an example computing device that may be operable to display a gallery view of social annotation data, in accordance with one or more aspects of this disclosure. FIG. 2 illustrates one particular example of server system 30, and many other example embodiments of server system 30 may be used in other instances.

As shown in the specific example of FIG. 2, server system 30 includes one or more processors 60, memory 62, a network interface 64, and one or more storage devices 66. Server system 30 also includes an operating system 68 that is executable by server system 30. Server system 30, in one example, further includes social network server 32 and user activity server 34 that are executable by server system 30. Each of components 60, 62, 64, 66, 68, 32, and 34 may be interconnected (physically, communicatively, and/or operatively) for inter-component communications.

Processors 60, in one example, are configured to implement functionality and/or process instructions for execution within client device 4. For example, processors 60 may be capable of processing instructions stored in memory 62 or instructions stored on storage devices 66.

Memory 62, in one example, is configured to store information within server system 30 during operation. Memory 62, in some examples, is described as a computer-readable storage medium. In some examples, memory 62 is a temporary memory, meaning that a primary purpose of memory 62 is not long-term storage. Memory 62, in some examples, is described as a volatile memory, meaning that memory 62 does not maintain stored contents when the computer is turned off. Examples of volatile memories include random access memories (RAM), dynamic random access memories (DRAM), static random access memories (SRAM), and other forms of volatile memories known in the art. In some examples, memory 62 is used to store program instructions for execution by processors 60. Memory 62, in one example, is used by software or applications running on server system 30 (e.g., applications 70) to temporarily store information during program execution.

Server system 30, in some examples, also includes a network interface 64. Server system 30, in one example, utilizes network interface 64 to communicate with external devices via one or more networks, such as one or more wireless networks. Network interface 64 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, server system 30 utilizes network interface 64 to wirelessly communicate with an external device such as client device 4 of FIG. 1, a mobile phone, or other networked computing device.

Storage devices 66, in some examples, also include one or more computer-readable storage media. Storage devices 66 may be configured to store larger amounts of information than memory 66. Storage devices 66 may further be configured for long-term storage of information. In some examples, storage devices 66 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. As shown in FIG. 2, storage device 66 includes user information data store 36, user activity data store 37, and social annotation data store 38. Each of user information data store 36, user activity data store 37, and social annotation data store 38 may be configured as a database, flat file, table, or other data structure stored within storage devices 66 of server system 30. In some examples user information data store 36, user activity data store 37, and social annotation data store 38 may be configured as three separate data stores while, in other examples, they may be a part of a single data store.

Server system 30 may include operating system 68. Operating system 68, in some examples, controls the operation of components of server system 30. For example, operating system 68, in one example, facilitates the interaction of social network server 32 and user activity server 34 with processors 60, memory 62, network interface 64, and storage device 66. Applications 70, social network server 32, and user activity server 34 may each include program instructions and/or data that are executable by server system 30. For example, social network server 32 and/or user activity server 34 may include instructions that cause server system 30 to perform one or more of the operations and actions described in the present disclosure.

In accordance with aspects of the present disclosure, server system 30 may receive user information, user activity information, and social annotation information from client device 4 of FIG. 1. For example, upon installation or configuration of user activity module 8 at client device 4, user 26 may provide information that specifies one or more one or more social network services and/or includes information that identifies one or more users that are to be displayed to user 26 when user 26 selects a social annotation field (e.g., social annotation field 22) if the one or more users have provided social annotation data. User activity module 8 may send the user information to server system 30. For example, social module 67 of social network server 32 and/or user activity module 69 of user activity server 34 may receive the user information and/or user activity information and store it within user information data store 36, user activity data store 37, or social annotation data store 38. In general, user information data store 36, user activity data store 37, or social annotation data store 38 may be configured to store any type of user information received from one or more different client devices (e.g., client devices 4 and client devices associated with users that provide social annotation data).

User activity server 34 may monitor users of the social network service and store social annotation information in social annotation data store 38. For example, when a user provides a social annotation (e.g., +1, comment, share, etc.), user activity module 69 may receive information including a user identifier identifying the user and an account of the social network service associated with the user, a time stamp of the social annotation, and location information. In some examples, the location may include a physical location of a client device associated with the user providing the social annotation data. Additionally, the location information may include a location associated with the user (e.g., a current and/or hometown location provided by the user in his or her profile). As such, user activity server 34 may receive social annotation data and information regarding the users providing the social annotation data and store the social annotation data and information at social annotation data store 38.

Additionally, user activity server 34 may receive contact identifiers that identify one or more actions indicating contact between users of the social network service. In one example, user activity module 69 may receive contact identifiers and store the contact identifiers in user activity data store 37. For example, user activity module 69 may receive contact identifiers when user 26 has tagged another user in a photograph that user 26 posted on the social network. Additionally, when user 26 sends a message and/or email to another user a contact identifier may be sent from user activity module 8 to the user activity module 69. User activity module 69 may also receive a contact identifier when user 26 instant messages another user, participates in a video communication session, calls another user, or has a scheduled event that both user 26 and another user is attending, as non-limiting examples.

User activity module 69 may further monitor a user's account of the social network service. For example, user activity module 69 may monitor and store any changes to user's 26 account at the social network service and store the changes in the user information module 36. That is, social module 67 may receive changes user 26 makes with his or her account (e.g., adding/removing users from social groups). User activity module 69 may receive the user activity information from client device 4 and client devices associated with users providing social annotation data. User activity module 69 may receive user information regarding the activity of users and store the information in the user information data store 36, user activity data store 37, and/or social annotation data store 38.

In some examples, when user 26 selects social annotation field 22, social module 67 of social network server 32 may receive a signal including a user identifier, as discussed herein. In some examples, the user identifier also includes location information. Social module 67 may use the user identifier to organize the social information of the plurality of users that provided social annotation data into an ordered arrangement according to the order associated with each tab 40. For example, social module 67 may identify the users that provided the social annotation data 24 and identify relationships according to the order associated with the plurality of tabs 40. For example, social module 67 may query user information data store 36, user activity data store 37, and social annotation 38 to determine the order associated with each tab 40 based on the user identifier, as discussed herein.

Figure 3:
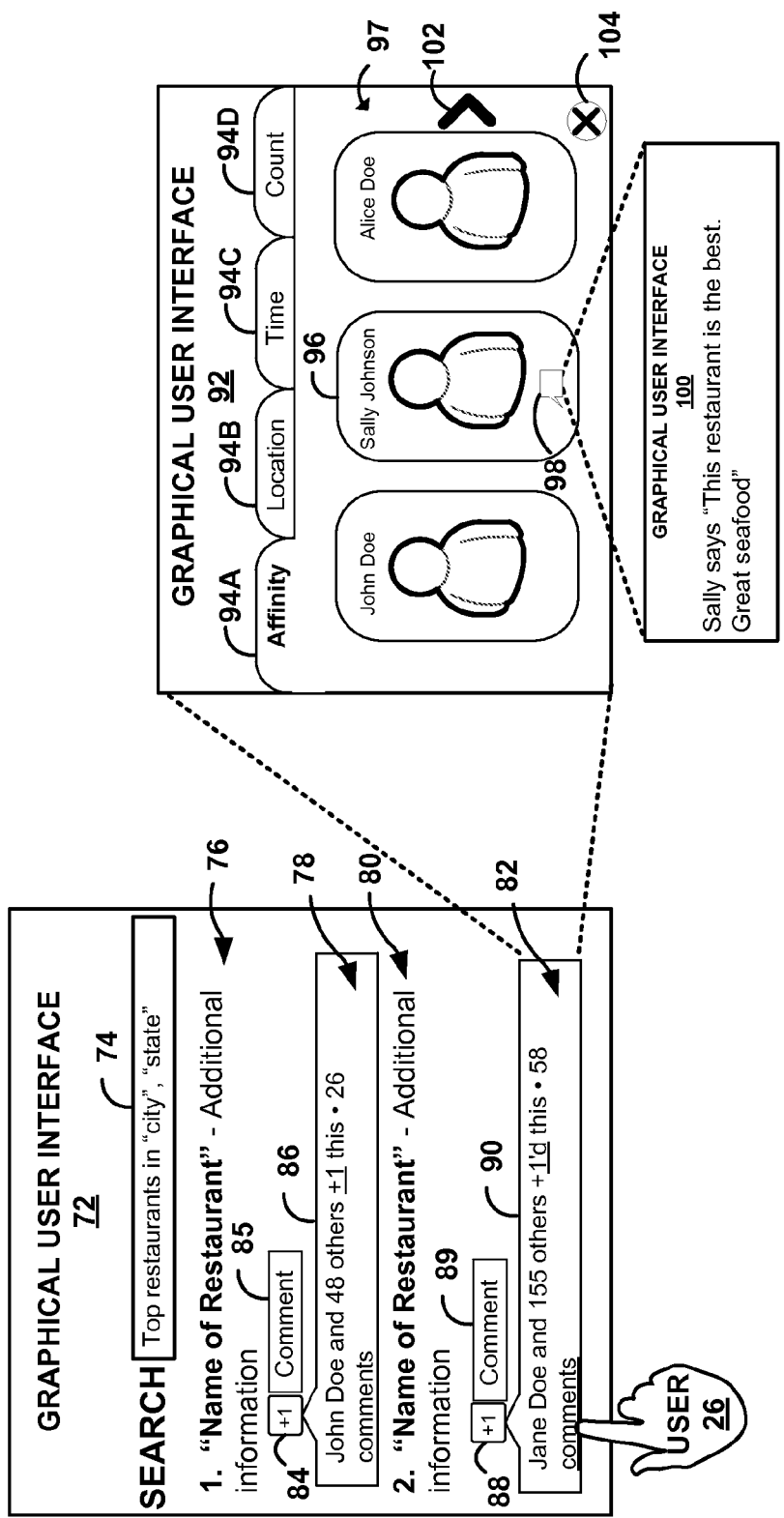
FIG. 3 is a screen illustration showing an example graphical user interface that includes social annotation data from a plurality of users, in accordance with one or more aspects of the present disclosure.

FIG. 3 is a screen illustration showing an example graphical user interface 72 that includes social annotation data 78, 82 from a plurality of users, in accordance with one or more aspects of the present disclosure. For purposes of illustration only, the example screen illustration is described below within the context of system 2 of FIG. 1 and server system 30 of FIG. 2. As one example, FIG. 3 depicts a GUI 72 that may be configured for a mobile device (e.g., client device 4).

GUI 72 provides an example of a webpage displaying search results. As illustrated, user 26 entered "Top restaurant in 'city', 'state' into search input box 74. The results of the search include two restaurants 76, 80. Each restaurant 76, 80 (e.g., items) include social annotation data 78, 82 displayed in respective social annotation fields 86, 90. Additionally, GUI 72 includes social action buttons 84, 85, 88, and 89 that enable user 26 to provide his or her own social annotation data (e.g., recommendation, and comment) regarding the items (e.g., restaurants 76, 80). As illustrated in FIG. 3, social annotation data 78 states "John Doe and 48 others +1 this • 26 comments" and social annotation data 82 states "Jane Doe and 155 others +1'd this • 58 comments". As discussed herein, aspects of this disclosure optimize the displayed social annotation data such that it may be more meaningful to users. For example, Jane Doe and user 26 may not know each other and thus, Jane Doe's opinion regarding a restaurant may be meaningless to user 26. Therefore, user 26 may select social annotation field 90 to display a GUI (e.g., GUI 92) that displays the users that provided social annotation data in an ordered arrangement based on an order associated with each tab.

GUI 92 is a screen that includes a gallery view of social annotation data 82 in an organized manner according to user 26. GUI 92 may be generated by social network server 32 responsive to a user (e.g., user 26) selecting a social annotation field (e.g., social annotation field 90). GUI 92 includes a plurality of tabs 94A-D (collectively "tabs 94"). As discussed herein, upon selection of a particular tab 94, social information 97 for a portion of the users that provided social annotation data 82 are displayed in an ordered arrangement based on an order associated with the particular tab 94 (e.g., affinity tab 94A).

As illustrated in GUI 92, the affinity tab 94A is selected. For example, user 26 may provide input to select affinity tab 94A. In other examples, affinity tab 94A may be the default tab such that when user 26 selects social annotation field 90, affinity tab 94A is automatically selected. As discussed herein, the order associated with affinity tab 94A may be based on a relationship strength value. For example, the relationship strength value may be an indication of how close two users are to each other and may be determined by monitoring user activity between users of a social network service. As discussed herein, user activity module 8 may monitor contact between user 26 and other users and send the data to server system 30, where the information may be stored in user information data store 36, user activity data store 37, and/or social annotation data store 38. In other examples, user activity may be monitored by user activity server 34 of server system 30.

In some examples, monitoring contact between users may include determining a number of emails and/or messages exchanged between users, a number of calls between users, a number of text messages between users, and a number of pictures together. As the amount of contact increases between users increase, so does the relationship strength value. Additionally, the relationship strength value may be based on which social group of a social network service a user that provided social annotation data is associated with. For example, users within a "Friend" social group may be given a higher relationship strength value versus users within an "Acquaintance" social group. The monitored contact may be generated and may be sent by user activity module 8 from client device 4 to server system 30 and stored in user information data store 36, user activity data store 37, and/or social annotation data store 38. As discussed herein, user activity server 34 may monitor the contact and send user activity information to be stored in user information data store 36, user activity data store 37, and/or social annotation data store 38.

When user 26 activates social annotation field 90, client device 4 may send user information (e.g., a user identifier) and to social network server 32. Social network server 32 may use the user information to determine a relationship strength value between user 26 and the users that have provide social annotation data 82. For example, social network server 32 may retrieve users that provided social annotation data 82 from social annotation data store 38 and determine whether any of the users that provided social annotation data 82 have had contact with user 26, as described herein. That is, social network server 32 can determine a relationship strength value based on an amount of contact user 26 has had with each user that provided social annotation data 82.

Social network server 32 may send data configured to display social information 97 for a portion of the plurality of users that provided social annotation data 82 within GUI 92 in the ordered arrangement based on a relationship strength value. As illustrated in GUI 92, social information includes a graphical representation 96. John Doe has the highest relationship strength value with user 26 and is displayed first. Social information for Sally Johnson includes a comment bubble 98 indicating that Sally Johnson has also provided a comment in addition to a recommending item 80. User 26 may provide input selecting comment bubble 98 to view the comment from Sally Johnson. Upon selecting comment bubble 98, social network server 32 may send data configured to display the comment within GUI 100. As illustrated in GUI 100, the comment provided by Sally Johnson states "This restaurant is the best. Great seafood".

Additionally, GUI 92 may include a graphical arrow touch-target 102 to scroll through the portion of users. As discussed herein, the portion of users whose social information is sent from social network server 32 for display may include, for example, ten users. User 26 may select graphical arrow touch-target 102 to view additional users. In one example, if user 26 scrolls to the last user displayed (e.g., the tenth user), user 26 may select the graphical arrow touch-target 102. In response, information regarding an additional portion (e.g., another ten users) of users based on a relationship strength value may be sent to the social network server 32. Social network sever 32 may send the information about the additional portion of users for display at GUI 92. User 26 may select exit button 104 to close GUI 92 and return to GUI 72.

In one example, the relationship strength value between user 26 and all the users that provided social annotation data 82 may be zero. That is, user 26 may have had no previous contact with the plurality of users that provided social annotation data 82. In that instance, social network server 32 may send a message stating that no contacts have provided social annotation data 82. In other examples, if user 26 has not had contact with the users that provided social annotation data 82, but users within user 26's social groups have had contact with one or more of the plurality of users that provided social annotation data 82, the one or more of the plurality of users having contact with users in user 26's social groups can be displayed. Additionally, if two or more users of the plurality of users have equivalent relationship strength values, the social information 97 for the portion of the plurality of users may be displayed according to other means (e.g., alphabetically).

Figure 4B:
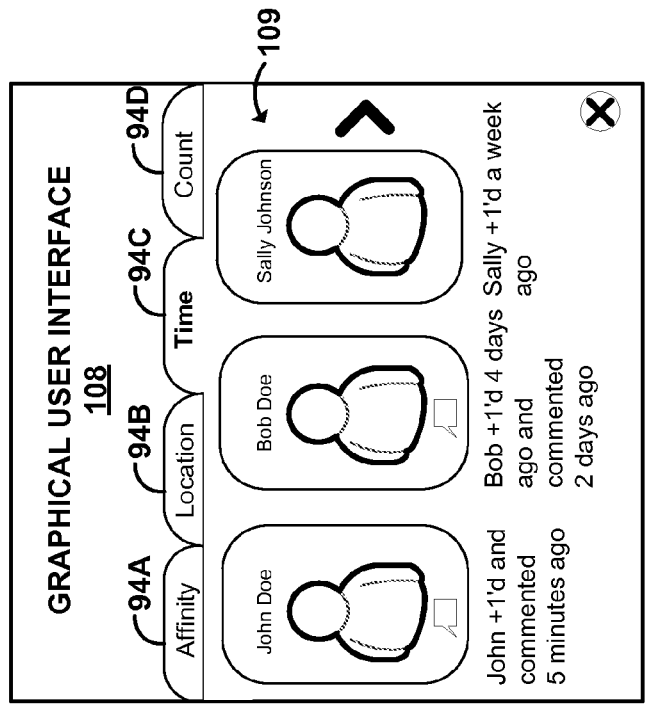
FIGS. 4A-D are screen illustrations showing example graphical user interfaces that include a gallery view of social annotation data, in accordance with one or more aspects of the present disclosure.
Figure 4A:
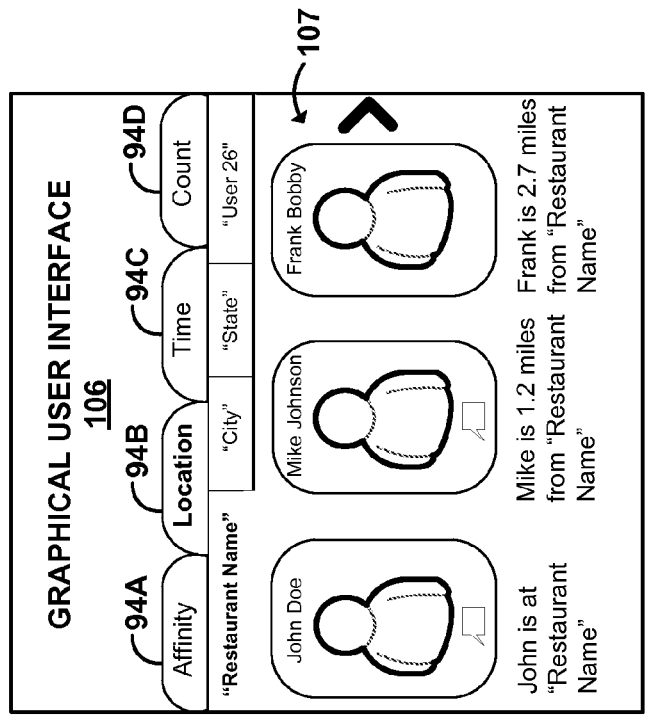

FIG. 4A is a screen illustration showing an example graphical user interface that includes a gallery view of social annotation data, in accordance with one or more aspects of the present disclosure. For example, FIG. 4A is another example of GUI 92 shown in FIG. 3. For purposes of illustration only, the example screen illustration is described below within the context of system 2 of FIG. 1 and GUI 92 of FIG. 3.

As illustrated in FIG. 4A, the location tab 94B is selected. For example, user 26 may provide input to select location tab 94B. As discussed herein, the order associated with location tab 94B may be based on an amount of distance. In some examples, the amount of distance may be based on a distance between a physical location of client device 4 and a respective location of each of a plurality of client devices, where each of the plurality of client devices is associated with a respective one of the plurality of users that provided social annotation data 82. For example, in response to user 26 selecting social annotation field 90, location module 9 may send a signal including location information corresponding to a physical location of client device 4 to server system 30. As discussed herein, when users provide social annotation data 82, location information corresponding to a physical location of the respective client device when the user provides the social annotation may be sent and stored at server system 30. Additionally, location information may include a location associated with the respective user (e.g., a current hometown). Social network server 32 may compare a physical location of client device 4 provided in the location information with respective location information of each of a plurality of client devices associated with the plurality of users that provided social annotation data 82. An amount of distance between client device 4 and the respective client devices associated with plurality of users that provided social annotation data 82 may be determined. Social information 107 for a portion of the plurality of users may be arranged in an increasing order according to the amount of distance.

Additionally, in response to receiving the selection of social annotation field 90, social network server 32 may determine a location associated with the object of the social annotation data. The object of social annotation data 82 is a restaurant (e.g., "Name of Restaurant"). Therefore, social network sever 32 may determine a location associated with "Name of Restaurant" (e.g., address of "Name of Restaurant"). Social network server 32 may compare the location associated with the object with location information of client devices associated with users that provided social annotation data 82. An amount of distance between the location associated with the object and the client devices associated with users that provided social annotation data may be determined. Users having the shortest distance from the location of the object may be display before users having a further distance.

As illustrated in FIG. 4A, upon selection of location tab 94B, user 26 may chose a location from which to sort the users. For example, user 26 may sort the users by an amount of distance based on a location associated with "Restaurant Name", a "City" associated with "Restaurant Name", a "State" associated with "Restaurant Name", and physical location of "User 26". That is, client devices of the plurality of users that provided social annotation data 82 may be arranged by distance (e.g., closest to farthest) from either a location of "Restaurant Name", a "City" where "Restaurant Name" is located, a "State" where "Restaurant Name" is located, or "User 26" (e.g., a physical location of client device 4 associated with user 26). For example, if user 26 is not from the area where "Restaurant Name" is located, user 26 may rather view social annotation data from users that live in the area.

As illustrated in FIG. 4A, user 26 has selected to organize the users based on a distance from the address of "Restaurant Name". John Doe was located at "Restaurant Name" when he provided a social annotation included in social annotation data 82. Additionally, Mike Johnson was 1.2 miles from "Restaurant Name" and Frank Bobby was 2.7 miles from "Restaurant Name" when they provided a social annotation included in social annotation data 82.

FIG. 4B is a screen illustration showing an example graphical user interface that includes a gallery view of social annotation data, in accordance with one or more aspects of the present disclosure. For example, FIG. 4B is another example of GUI 92 shown in FIG. 3. For purposes of illustration only, the example screen illustration is described below within the context of system 2 of FIG. 1 and GUI 72 of FIG. 3.

As illustrated in FIG. 4B, time tab 94C is selected. GUI 108 may display social information 109 for a portion of the plurality of users that provided social annotation data 82 based on an order associated with time tab 94C. For example, time tab 94C may display social information 109 for the portion of the plurality of users based on a time difference. That is, social information 109 for the portion of the plurality of users may be displayed in a chronological order (e.g., oldest to newest) or a reverse chronological order (e.g., newest to oldest) based on when the users provided social annotation included in social annotation data 82. As illustrated in FIG. 4B, the order associated with time tab 94C is a reverse chronological order. For example, "John Doe" recommended and commented on "Name of Restaurant" five minutes before user 26 selected social annotation field 90. "Bob Doe" recommended the "Name of Restaurant" four days before user 26 selected social annotation field 90 and commented on "Name of Restaurant" two days before user 26 selected social annotation field 90. Additionally, "Sally Johnson" recommended "Name of Restaurant" one week before user 26 selected social annotation field 90.

As discussed herein, in response to receiving a signal indicating the selection of social annotation field 90, social network server 32 may determine a time when user 26 selected social annotation field 90. Additionally, when the plurality of users provided social annotation data 82, social network server 32 may have received time information associated with a time stamp of when the users provided a social annotation included in social annotation data 82 and stored the time stamp in social annotation data store 38. Social network server 32 may compare the time associated with when user 26 selected social annotation field 90 with the time stamps of the social annotations provided by plurality of users included in social annotation data 82. A time difference may be determined and social information 109 for a portion of the plurality of users may be displayed at GUI 108 in, for example, reverse chronological order.

Figure 4D:
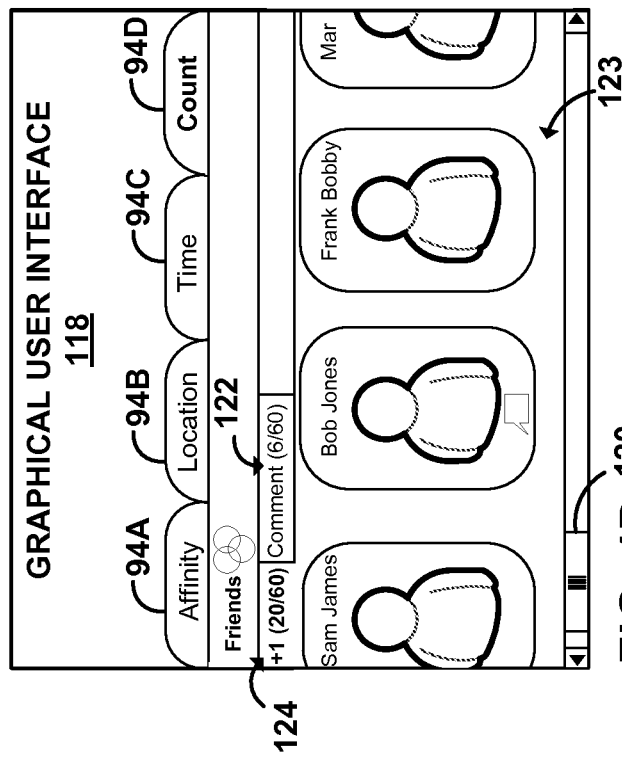
Figure 4C:
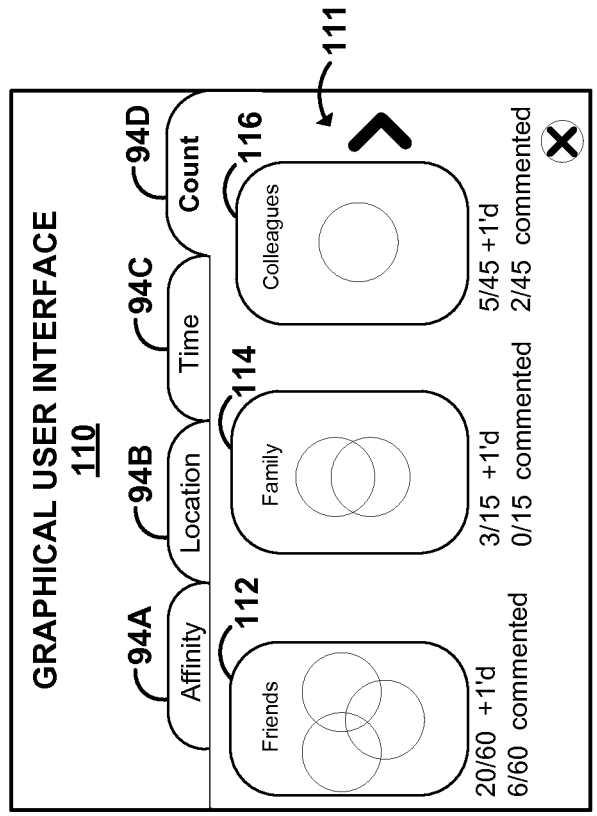

FIG. 4C is a screen illustration showing an example graphical user interface that includes a gallery view of social annotation data, in accordance with one or more aspects of the present disclosure. FIG. 4C is a screen illustration showing GUI 110, which is another example of GUI 92 shown in FIG. 3. For purposes of illustration only, the example screen illustration is described below within the context of system 2 of FIG. 1 and GUI 92 of FIG. 3.

As illustrated in FIG. 4C, the count tab 94D is selected. The order associated with count tab 94D may be based on a number of users of one or more social groups of the user account that provided social annotation data 82. For example, count tab 94D may display a graphical representation 111 of user 26's social groups and display the number of users within each social group that provided social annotation data 82. As discussed herein, changes within an account of user 26 such as adding users to a social group of the social network service may be monitored. User activity module 8 may monitor the changes and generate user information that client device 4 may send to server system 30 and store in user information data store 36. Additionally, user activity server 34 may monitor changes within user 26's account and store any changes in user information data store 36. Social network server 32 may use the user account identifier received when user 26 selects social annotation field 90 and compare the plurality of users that provided social annotation data 82 with users contained in user 26's social groups. Server network server 32 may then determine a number of users in each social group that provided social annotation data 82. Server network server 32 may send data configured to display graphical representation 111 of each social group. Graphical representation 111 may include social group information indicating how many users of each social group provided social annotation data 82.

As illustrated in FIG. 4C, graphical representations 111 of social groups, including Friends 112, Family 114, and Colleagues 116, are displayed within GUI 110. Included in the graphical information 111 is social information indicating a number of the total users within each social group that provided social annotation data 82. For example, under Friends 112, the text "20/60 +1'd" and "6/60 commented" is displayed, under Family 114 the text "3/15 +1'd" and "0/15 commented" is displayed, and under Colleagues 116 the text "5/45 +1'd" and "2/45 commented" is displayed. User 26 may provide input selecting a social group (e.g., Friends 112, Family 114, or Colleagues 116) to view which users of each social group provided social annotation data 82 and to see each users social annotation (e.g., as illustrated in FIG. 4D).

FIG. 4D is a screen illustration showing another example graphical user interface 118 that includes a gallery view of social annotation data, in accordance with one or more aspects of the present disclosure. For purposes of illustration only, the example screen illustration is described below within the context of system 2 of FIG. 1, GUI 110 of FIG. 4C, and GUI 72 of FIG. 3.

As illustrated in FIG. 4D, the count tab 94D is selected and user 26 has provided input selecting the social group Friends 112. As illustrated in GUI 118, user 26 may select to view users in the Friends 122 social group based on a type of social annotation data 82 (e.g., +1 or comment). For example, user 26 may select "+1 (20/60)" to view users within Friends 112 social group that recommended item 80 or user 26 may select "Comment (6/60)" to view users within Friends 112 social group that commented on item 80. As illustrated in FIG. 4D, user 26 provided input selecting "+1 (20/60)" and social information 123 of the plurality of users within user 26's Friends 112 social group are displayed. In some examples, the order in which users of a social group are displayed may be alphabetical. In other examples, the order in which users of a social group are displayed may be based on the order associated with one of the affinity tab 94A, the location tab 94B, or the time tab 94C.

Figure 5:
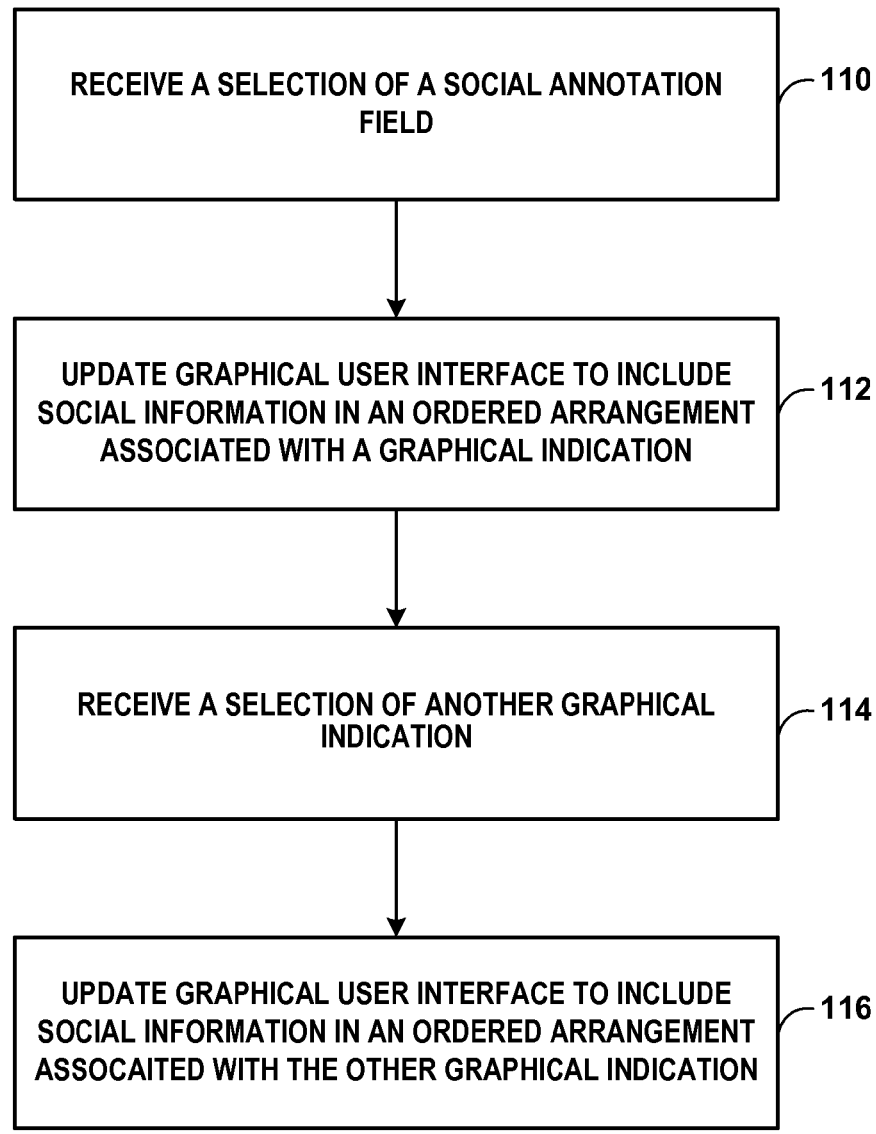
FIG. 5 is a flow chart illustrating an example process to display a gallery view of social annotation data, in accordance with one or more aspects of this disclosure.

FIG. 5 is a flow chart illustrating an example process for displaying a gallery view of social annotation data, in accordance with one or more aspects of this disclosure. For purposes of illustration only, the example process is described below as being performed by one or more elements of system 2 of FIG. 1 and server system 30 of FIG. 2.

The process may include, receiving an indication of a selection of an item displayed at a graphical user interface of the computing device (110). For example, client device 4 may receive an indication of a selection of social annotation field 22 displayed at GUI 14 associated with user 26, as discussed herein. Social annotation field 22 may include social annotation data 24 provided by a plurality of users for item 18. Additionally, user 26 and each user of the plurality of users that provided the social annotation data 24 have an account associated with a social network service.

The process may include updating the graphical user interface to display, in a first ordered arrangement, at least a portion of social information associated with the item and provided by a plurality of other users, and a plurality of selectable objects each corresponding to one of a plurality of ordered arrangements (112). For example, client device 4 may update GUI 45, which may be a part of GUI 14, with social information stored at client device 4 and/or received from server system 30, where the social information is displayed in GUI 14 in a first ordered arrangement of the plurality of users according to an order associated with at least one of affinity tab 40A, location tab 40B, time tab 40C, and count tab 40D, as discussed herein.

The process may include receiving an indication of a selection of a selectable object of the plurality of selectable objects (114). For example, user 26 may select time tab 40C and client device 4 receives an indication of the selection of time tab 40C. Time tab 40C is one of a plurality of graphical indications selectable by user 26 and included in GUI 45. Other examples of graphical indications that are selectable by user 26 and included in the example of GUI 45 include affinity tab 40A, location tab 40B, and count tab 40D.

The process may include, responsive to receiving the indication of the selection of the selectable object, updating, based at least in part on the selection of the selectable object, the graphical user interface to display a second portion of the social information associated with the item in a second ordered arrangement (116). As discussed herein, a selection of each graphical indication (e.g., tab) causes client device 4 to update GUI 45 to display the social information of at least a portion of the plurality of users that provided social annotation data in the ordered arrangement based on the order associated with the selected graphical indication. Activation of each tab 40 displays graphical representation 42 of a portion of the plurality of users in the ordered arrangement based on the order associated with the activated tab. As discussed herein, the plurality of tabs 40 may include affinity tab 40A, location tab 40B, time tab 40C, and count tab 40D.

In one example, each selectable object of the plurality of selectable objects may be at least one of a tab, a link, text, an image, a check box, a button, a drop down menu, and a list.

In one example, each selectable object of the plurality of selectable objects is associated with a respective ordered arrangement of the plurality of ordered arrangements. In another example, the user and each user of the plurality of other users have a user account associated with a social network service.

In some examples, the second ordered arrangement is based at least in part on a relationship strength value between the user and the plurality of other users that provided social annotation data. In examples where the second ordered arrangement is based on the relationship strength value, the process may include receiving the social information associated with the item in a decreasing order according to the relationship strength value, wherein the relationship strength value is based at least in part on an amount of contact between the user and each respective other user of the plurality of other users. The amount of contact may be based at least in part on at least one of a number of telephone calls, a number of emails, a number of text messages, a number of appointments in a calendar together, and a number of pictures between the user and each one of the plurality of other users. For example, social network server 32 and/or user activity server 34 may query user information data store 26, user activity data store 37, and/or social annotation data store 38 to determine an amount of contact between user 26 and the plurality of users that provided social annotation data 24.

In some examples, the second ordered arrangement is based at least in part on an amount of distance between at least one of a physical location of a respective computing device associated with the respective user and a physical location of each respective client device associated with each other user of the plurality of users, and a physical location associated with the item and the physical location of each respective client device associated with each other user of the plurality of users. In these examples, the process may include receiving the social information associated with the item in an order according to the amount of distance.

The process may include receiving an indication of a selection of a second selectable object of the plurality of selectable objects displayed at the graphical user interface. The process may also include, responsive to receiving the indication of the selection of the second graphical indication, updating, based at least in part on the selection of the second graphical indication, the graphical user interface to display at least a second portion of the social information associated with item in a third ordered arrangement of the plurality of ordered arrangements, wherein the third ordered arrangement is associated with the second selectable object.

In one example, the third ordered arrangement is based at least in part on a time difference between a first time stamp associated with the selection of item and a time stamp associated with the social information provided by the plurality of other users. In this example, the process may include updating the graphical user interface to display at least a second portion the social information associated with the item in an order according to the time difference.

In another example, the third ordered arrangement is based at least in part on a number of users of one or more social groups of a user account of the user and the user account is associated with a social network service. In this example, the process may also include updating the graphical user interface to display at least a second portion of the social information associated with the item in am order according to the number of users of each of the one or more social groups of the user account.

In one example, the social information provided by a respective other users of the plurality of other users includes at least one of social annotation data, a user account identifier, a location identifier corresponding to a physical location of a client device of the respective other users, and a time identifier corresponding to a current time. In some examples, the first ordered arrangement is a default ordered arrangement, and the default order arrangement is user configurable In another example, the graphical user interface includes a comment icon associated with one of the plurality of other users. In this example, the process may also include receiving an indication of a selection of the comment icon and displaying a comment provided by the one of the plurality of other users.

Figure 6:
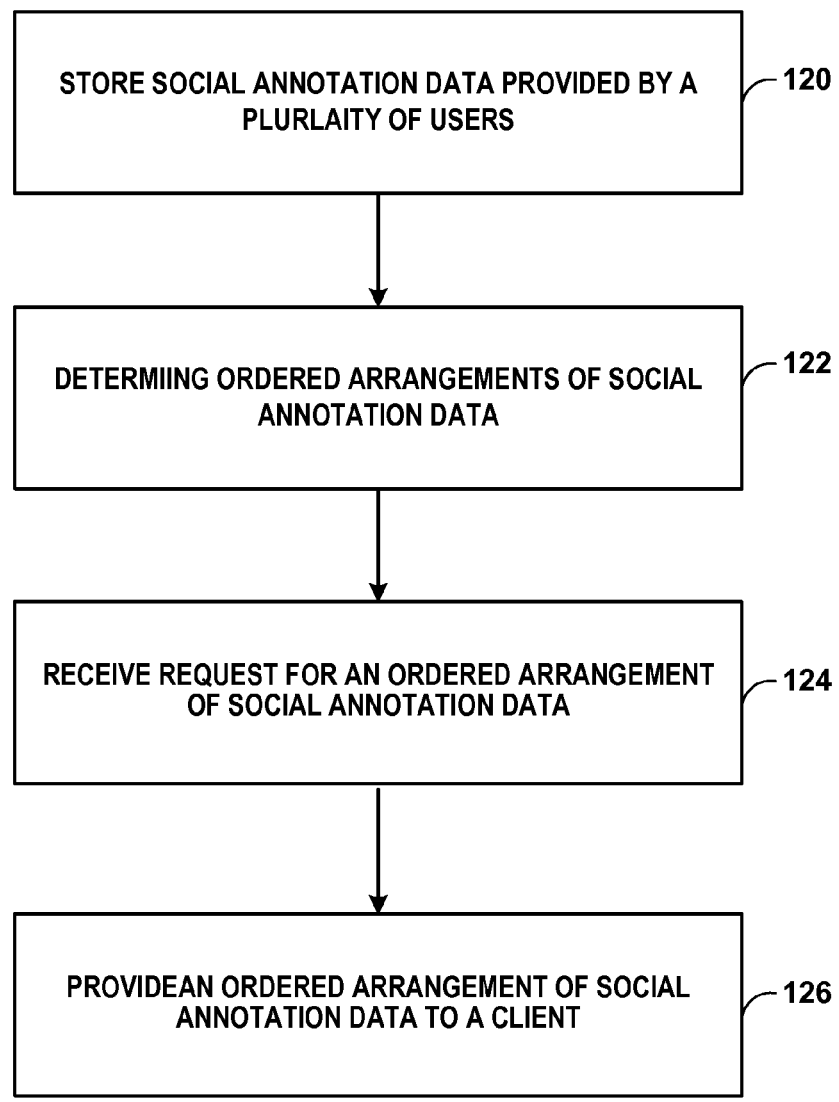
FIG. 6 is a flow chart illustrating an example process to determine ordered arrangements of social information, in accordance with one or more aspects of this disclosure.

FIG. 6 is a flow chart illustrating an example process to determine ordered arrangements of social information, in accordance with one or more aspects of this disclosure. For purposes of illustration only, the example process is described below as being performed by one or more elements of system 2 of FIG. 1 and server system 30 of FIG. 2.

The process may include storing social annotation data provided by a plurality of users for an item (120). For example, server system 30 may receive social annotation data provided by a plurality of users (e.g., user 26) for item 18. Server system 18 may store the received social annotation data in social annotation data 38.

The process may include determining a plurality of ordered arrangements of the social annotation data for each respective user of the plurality of users (122). In some examples, at least one of the plurality of ordered arrangements is based on a relationship strength value for each respective user of the plurality of users, wherein the relationship strength value is based at least in part on an amount of contact between the respective user and each other user of the plurality of users. In some examples, at least one of the plurality of ordered arrangements is based on distance between at least one of a physical location of a respective computing device associated with the respective user and a physical location of each respective client device associated with each other user of the plurality of users, and a physical location associated with the item and the physical location of each respective client device associated with each other user of the plurality of users.

The process may include receiving, from a client device, a request for an ordered arrangement of the social annotation data. For example, server system 30 may receive a request for relationship strength value ordered social annotation data from client device 4, as described herein.

The process may include providing, to the client device, the ordered arrangement of the social annotation data (124). For example, server system 30 may provide the social information to client device 4 for display at GUI 45 in accordance with an ordered arrangement associated with a selected one of tabs 40 (e.g., relationship strength value order associated with affinity tab 40A), as described herein.

In one example, the ordered arrangement of social annotation data includes information specifying an ordering for social annotation data stored at the client device. In another example, the ordered arrangement of social annotation data includes at least a portion of the social annotation data provided by the plurality of users for the item and information specifying an ordering for the portion of the social annotation data.

In some examples, the ordered arrangement of social annotation data includes at least a portion of the social annotation data provided by the plurality of users for the item. In these examples, the process may include identifying the portion of social annotation data to provide to the client device based at least in part on the requested ordered arrangement, and providing the identified portion of the social annotation data to the client device.

Techniques of the present disclosure provide for displaying social annotation data in a relevant and organized manner. As discussed herein, users interacting with communications networks such as the Internet may encounter a large amount of social annotation data provided by a plurality of users. To enable users to obtain more relevant information, aspects of this disclosure provides displaying a portion of the plurality of users that provided social annotation data in an ordered arrangement based on an order associated with an activated tab. That is, the user is presented with a plurality of tabs such that the user may determine how to organize information from other users.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the process described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A method comprising:
   receiving, by a computing device associated with a user, an indication of a selection of a graphical element displayed at a graphical user interface of the computing device, the graphical element being associated with social information provided by a plurality of other users, wherein the graphical user interface includes content, and wherein the social information is associated with the content;
   responsive to receiving the indication of the selection of the graphical element, updating, by the computing device, the graphical user interface to include a social information overlay across at least a portion of the content, the social information overlay including, in a first ordered arrangement of a plurality of ordered arrangements, at least a portion of the social information associated with the content and a plurality of selectable objects each corresponding to a respective one of the plurality of ordered arrangements, wherein at least one of the plurality of ordered arrangements is based on a relationship strength value for each respective user from the plurality of users, wherein the relationship strength value is based at least in part on an amount of contact between the respective user and each other user from the plurality of users, and wherein at least another one of the plurality of ordered arrangements is based on a distance between a physical location associated with the content and the physical location of each respective client device associated with at least one user from the plurality of users;
   receiving, by the computing device, an indication of a selection of a selectable object of the plurality of selectable objects; and
   responsive to receiving the indication of the selection of the selectable object, updating, by the computing device and based at least in part on the selection of the selectable object, the social information overlay to include a second portion of the social information associated with the content in the at least another one of the plurality of ordered arrangements.

2. The method of claim 1, wherein each selectable object of the plurality of selectable objects comprises at least one of a tab, a link, text, an image, a check box, a button, a drop down menu, and a list.

3. The method of claim 1, wherein each selectable object of the plurality of selectable objects is associated with a respective ordered arrangement of the plurality of ordered arrangements.

4. The method of claim 1, wherein the user and each user of the plurality of other users have a user account associated with a social network service.

5. The method of claim 1, wherein the relationship strength value for each respective user from the plurality of other users corresponds to a respective relationship strength between the user and the respective user from the plurality of other users that provided social annotation data.

6. The method of claim 5, further comprising:
   receiving, by the computing device, the social information associated with the content in a decreasing order according to the relationship strength value, wherein the relationship strength value is based at least in part on an amount of contact between the user and each respective other user of the plurality of other users.

7. The method of claim 6, wherein the amount of contact is based at least in part on at least one of a number of telephone calls, a number of emails, a number of text messages, a number of appointments in a calendar together, and a number of pictures between the user and each one of the plurality of other users.

8. The method of claim 1, wherein the indication of the selection of the selectable object comprises an indication of a selection of a first selectable object, the method further comprising:
   receiving, by the computing device, an indication of a selection of a second selectable object of the plurality of selectable objects included in the social information overlay;
   responsive to receiving the indication of the selection of the second graphical indication, updating, by the computing device and based at least in part on the selection of the second graphical indication, the social information overlay to include at least a second portion of the social information associated with the content in a third ordered arrangement of the plurality of ordered arrangements, wherein the third ordered arrangement is associated with the second selectable object.

9. The method of claim 1, further comprising:
   receiving, by the computing device, the social information associated with the content in an order according to the amount of distance.

10. The method of claim 8, wherein the third ordered arrangement is based at least in part on an amount of distance between a physical location of a respective computing device associated with the respective user and a physical location of each respective client device associated with each other user of the plurality of users.

11. The method of claim 8, wherein the third ordered arrangement is based at least in part on a time difference between a first time stamp associated with the selection of the content and a time stamp associated with the social information provided by the plurality of other users.

12. The method of claim 11, further comprising:
    updating, by the computing device, the social information overlay to include at least a second portion the social information associated with the content in an order according to the time difference.

13. The method of claim 8, wherein the third ordered arrangement is based at least in part on a number of users of one or more social groups of a user account of the user, and wherein the user account is associated with a social network service.

14. The method of claim 13, further comprising:
    updating, by the computing device, the social information overlay to include at least a second portion of the social information associated with the content in an order according to the number of users of each of the one or more social groups of the user account.

15. The method of claim 1, wherein the social information provided by a respective other users of the plurality of other users includes at least one of social annotation data, a user account identifier, a location identifier corresponding to a physical location of a client device of the respective other users, and a time identifier corresponding to a current time.

16. The method of claim 1, wherein the first ordered arrangement is a default ordered arrangement, and wherein the default order arrangement is user configurable.

17. The method of claim 1, wherein the graphical user interface includes a comment icon associated with one of the plurality of other users, the method further comprises:
    receiving, by the computing device, an indication of a selection of the comment icon; and
    displaying, by the computing device, a comment provided by the one of the plurality of other users.

18. A computer-readable memory encoded with instructions that cause one or more processors of a computing device associated with a user to perform operations comprising:
- receiving an indication of a selection of a graphical element displayed at a graphical user interface of the computing device, the graphical element being associated with social information provided by a plurality of other users, wherein the graphical user interface includes content, and wherein the social information is associated with the content;
- responsive to receiving the indication of the selection of the graphical element, updating the graphical user interface to include a social information overlay across at least a portion of the content, the social information overlay including, in a first ordered arrangement of a plurality of ordered arrangements, at least a portion of the social information associated with the content and a plurality of selectable objects each corresponding to a respective one of the plurality of ordered arrangements, wherein at least one of the plurality of ordered arrangements is based on a relationship strength value for each respective user from the plurality of users, wherein the relationship strength value is based at least in part on an amount of contact between the respective user and each other user from the plurality of users, and wherein at least another one of the plurality of ordered arrangements is based on a distance between a physical location associated with the content and the physical location of each respective client device associated with at least one user from the plurality of users;
- receiving an indication of a selection of a selectable object of the plurality of selectable objects; and
- responsive to receiving the indication of the selection of the selectable object, updating, based at least in part on the selection of the selectable object, the social information overlay to include a second portion of the social information associated with the content in the at least another one of the plurality of ordered arrangements.

19. A system comprising:
- one or more server computers; and
- at least one application operable to provide instructions to the one or more server computers to:
  - receive an indication of a selection of a graphical element displayed at a graphical user interface of the computing device, the graphical element being associated with social information provided by a plurality of other users, wherein the graphical user interface includes content, and wherein the social information is associated with the content;
  - responsive to receiving the indication of the selection of the graphical element, update the graphical user interface to include a social information overlay across at least a portion of the content, the social information overlay including, in a first ordered arrangement of a plurality of ordered arrangements, at least a portion of the social information associated with the content and a plurality of selectable objects each corresponding to a respective one of the plurality of ordered arrangements, wherein at least one of the plurality of ordered arrangements is based on a relationship strength value for each respective user from the plurality of users, wherein the relationship strength value is based at least in part on an amount of contact between the respective user and each other user from the plurality of users, and wherein at least another one of the plurality of ordered arrangements is based on a distance between a physical location associated with the content and the physical location of each respective client device associated with at least one user from the plurality of users;
  - receive an indication of a selection of a selectable object of the plurality of selectable objects;
  - responsive to receiving the indication of the selection of the selectable object, update, based at least in part on the selection of the selectable object, the social information overlay to include a second portion of the social information associated with the content in the at least another one of the plurality of ordered arrangements.

20. A method comprising:
- storing, by one or more computing devices, social annotation data provided by a plurality of users and associated with content, wherein each user from the plurality of users is associated with a respective user account of a social network service;
- determining, by the one or more computing devices, a plurality of ordered arrangements of the social annotation data for each respective user from the plurality of users,
  - wherein at least one of the plurality of ordered arrangements is based on a relationship strength value for each respective user from the plurality of users, wherein the relationship strength value is based at least in part on an amount of contact between the respective user and each other user from the plurality of users, and
  - wherein at least one of the plurality of ordered arrangements is based on a distance between a physical location associated with the content and the physical location of each respective client device associated with at least one user from the plurality of users;
- receiving, by the one or more computing devices from a client device, a request for an ordered arrangement of the social annotation data, the request specifying a subset of the plurality of users, wherein each user from the subset of users is included in a social group of a user account of the social network service associated with a user of the client device; and
- providing, by the one or more computing devices to the client device, the ordered arrangement of a portion of the social annotation data provided by the subset of users.

21. The method of claim 20, wherein the ordered arrangement of social annotation data includes information specifying an ordering for social annotation data stored at the client device.

22. The method of claim 20, wherein the ordered arrangement of social annotation data includes information specifying an ordering for the portion of the social annotation data.

23. The method of claim 20, further comprising:
- identifying, by the one or more computing devices, the portion of social annotation data to provide to the client device based at least in part on the requested ordered arrangement; and
- providing the identified portion of the social annotation data to the client device.

* * * * *